(12) United States Patent
Weaver et al.

(10) Patent No.: US 11,572,114 B2
(45) Date of Patent: Feb. 7, 2023

(54) TRACK ASSEMBLY BUSHING HAVING A WEAR MEMBER

(71) Applicant: Caterpillar Inc., Peoria, IL (US)

(72) Inventors: Douglas Trent Weaver, Brimfield, IL (US); Mark D. Veliz, Metamora, IL (US); Roger L. Recker, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 407 days.

(21) Appl. No.: 16/813,900

(22) Filed: Mar. 10, 2020

(65) Prior Publication Data

US 2021/0284259 A1  Sep. 16, 2021

(51) Int. Cl.
*B62D 55/21* (2006.01)
*B21K 23/02* (2006.01)
*B62D 55/32* (2006.01)

(52) U.S. Cl.
CPC .............. *B62D 55/21* (2013.01); *B21K 23/02* (2013.01); *B62D 55/32* (2013.01)

(58) Field of Classification Search
CPC ........ B62D 55/21; B62D 55/32; B62D 55/15; B62D 55/12; Y10T 16/05; Y10T 29/49668; F16C 17/02; F16C 17/022; F16C 33/06; F16C 2350/26; B21K 23/02
See application file for complete search history.

(56) References Cited

U.S. PATENT DOCUMENTS

| | | | | |
|---|---|---|---|---|
| 3,684,585 A | * | 8/1972 | Stroup | C23C 16/32 423/239.1 |
| 4,042,282 A | * | 8/1977 | Haslett | B60S 1/68 384/282 |
| 6,414,258 B1 | * | 7/2002 | Amano | B62D 55/125 219/76.14 |
| 7,364,176 B2 | | 4/2008 | Saitoh et al. | |
| 8,480,103 B2 | | 7/2013 | Kiselis et al. | |
| 8,684,475 B2 | | 4/2014 | Wodrich et al. | |
| 2003/0150140 A1 | * | 8/2003 | Takayama | F16C 33/103 37/458 |
| 2006/0017323 A1 | * | 1/2006 | Wodrich | B62D 55/32 305/202 |
| 2007/0154738 A1 | * | 7/2007 | Ganguly | C23C 30/00 427/446 |
| 2017/0158269 A1 | * | 6/2017 | March | B62D 55/092 |
| 2017/0216949 A1 | * | 8/2017 | Oh | B62D 55/12 |

FOREIGN PATENT DOCUMENTS

| | | |
|---|---|---|
| CA | 2563627 A1 | 3/2008 |
| EP | 1342651 | 2/2009 |
| JP | H04218419 A | 8/1992 |

(Continued)

*Primary Examiner* — Kip T Kotter
*Assistant Examiner* — Emily G. Castonguay
(74) *Attorney, Agent, or Firm* — Bookoff McAndrews PLLC (57) ABSTRACT

A bushing for a track assembly includes a tubular bushing substrate having a longitudinal length and an outer surface. The outer surface includes at least one flat portion. The bushing also includes at least one white iron member. The at least one white iron member includes a flat inner surface, and the flat inner surface of the at least one white iron member is fixed to the flat portion of the outer surface of the tubular bushing substrate.

19 Claims, 6 Drawing Sheets

(56) References Cited

FOREIGN PATENT DOCUMENTS

| | | | | | |
|---|---|---|---|---|---|
| JP | H0676729 | U | * | 10/1994 | ............... C21D 5/04 |
| JP | 2005090620 | A | * | 4/2005 | |
| JP | 2008528294 | A | | 7/2008 | |
| KR | 20130086767 | A | | 8/2013 | |
| WO | 2019109138 | | | 6/2019 | |
| WO | WO-2019109138 | A1 | * | 6/2019 | ............... C21D 5/04 |

* cited by examiner

TRACK ASSEMBLY BUSHING HAVING A WEAR MEMBER

TECHNICAL FIELD

The present disclosure relates generally to a bushing, and more particularly, to a bushing for a track assembly of a machine having a wear member.

BACKGROUND

Track type machines typically utilize track chains on each side of the machine that engage the ground surface during propulsion of the machine. A plurality of individual links are pivotably coupled via bushing and pin arrangements to form the track chain. A sprocket, driven by an engine of the machine, engages the bushings and translates the chain about one or more idlers. As the chain translates, the connected links engage a ground surface under the machine, for example, via coupled track shoes, and propel the machine on the surface. Track chains can be a straight link chains with alternating inner and outer links, or can be offset link chains where all the links are alike. In both types of track chains, the elements wear over time, particularly the bushings that are continuously engaging with the sprocket in order to propel the machine. Hardening elements of the track chain may increase the durability and wear-resistance of the track chain element, but may also increase the brittleness or otherwise negatively affect the properties of the track chain element. As such, wear-resistance and strength, along with costs of production and maintenance, are often important considerations in the manufacture and assembly of the track chain.

An exemplary track chain is disclosed in U.S. Pat. No. 8,684,475 ("the '475 patent") to Wodrick et al. The '475 patent discloses a track pin bushing for an endless traction chain. The track pin bushing in the '475 patent may have a metallurgically bonded wear-resistant coating. While the bushings of the '475 patent may be suitable for some applications, they may not be suitable for other applications.

The bushings of the present disclosure may solve one or more of the problems set forth above and/or other problems in the art. The scope of the current disclosure, however, is defined by the attached claims, and not by the ability to solve any specific problem.

SUMMARY

In one aspect, a bushing for a track assembly may include a tubular bushing substrate having a longitudinal length and an outer surface. The outer surface may include at least one flat portion. The bushing may also include at least one white iron member. The at least one white iron member may include a flat inner surface, and the flat inner surface of the at least one white iron member may be fixed to the flat portion of the outer surface of the tubular bushing substrate.

In another aspect, a method of producing a bushing for a track assembly may include fixing at least one white iron member to an outer surface of a tubular bushing substrate. The at least one white iron member may include a flat inner portion, and the tubular bushing substrate may include a flat outer portion. The flat inner portion may be mated to the flat outer portion.

In yet another aspect, a track assembly bushing may include a tubular bushing substrate having a longitudinal length, an axial bore configured to receive a pin, and a recess. The recess may be formed in an outer surface of a central portion of the tubular bushing substrate, and the recess may include a flat surface. The track assembly bushing may also include a wear member. The wear member may include a flat inner surface. The wear member may be at least partially received in the recess, and the flat inner surface may be fixed to the flat surface of the recess.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," and "approximately" are used to indicate a possible variation of ±10% in the stated value.

Figure 1:
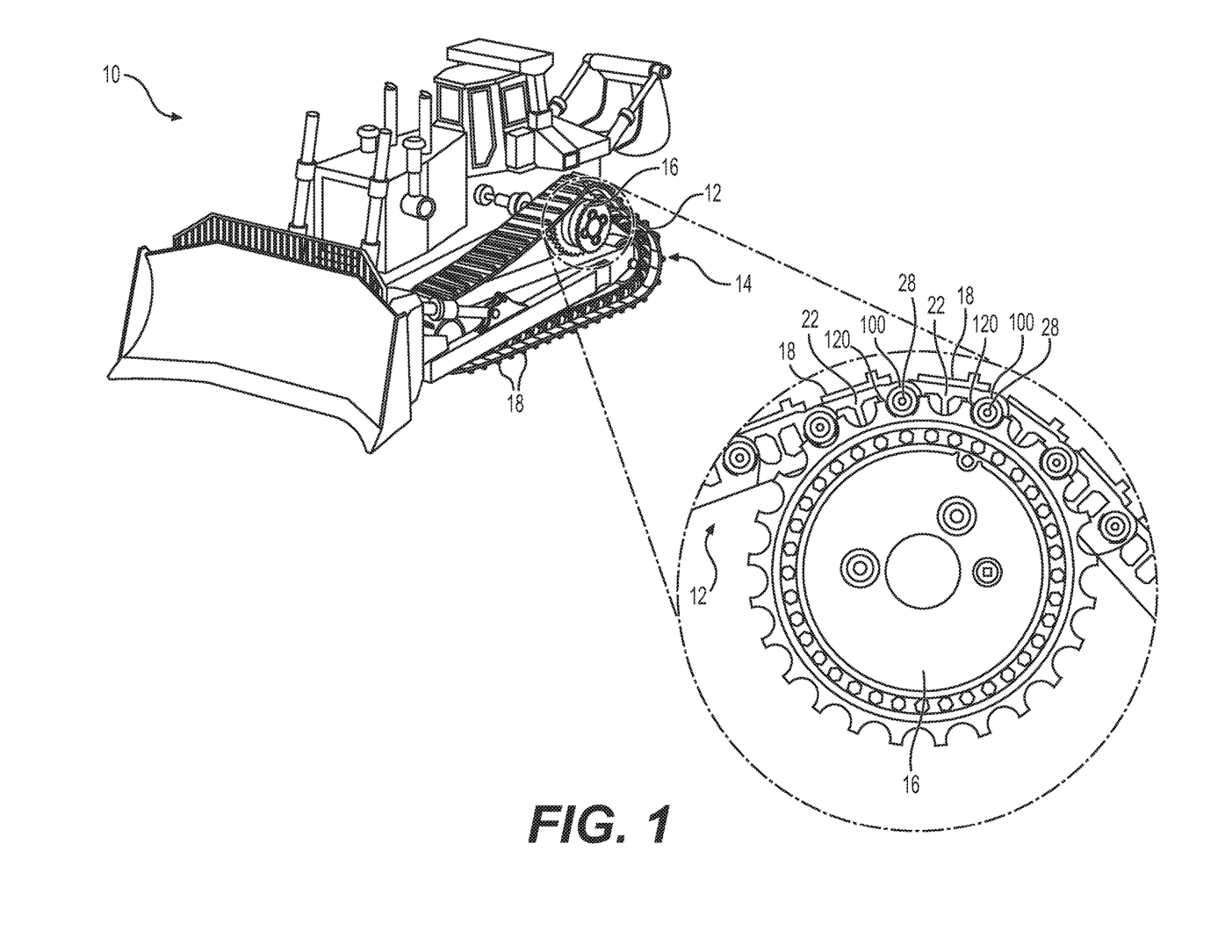
FIG. 1 is a perspective view of an exemplary machine, with an enlarged section of the exemplary machine showing the engagement of a sprocket and bushings of a track assembly.

FIG. 1 illustrates a machine 10 with a track assembly 12 according to the present disclosure. Machine 10 may be a track-type tractor or any mobile machine that performs some type of operation with an industry, such as mining, construction, farming, transportation, or any other industry known in the art, for example, a dozer, an excavator, a loader, a backhoe, a motor grader, or any other earth moving machine. In one aspect, machine 10 may be a medium track-type tractor. In other aspects, however, machine 10 may be a small track-type tractor or a large track-type tractor. Track assembly 12, which may also be referred to as a track link assembly, may be coupled to an undercarriage assembly 14 of machine 10 and driven by a machine engine or other power source (not shown) via at least one drive gear or sprocket 16. A separate track assembly 12 may be coupled to each side of machine 10, with each track assembly 12 forming separate endless loops. A plurality of track shoes 18 may be coupled to an outer surface of track assembly 12 in order to aid in the engagement of the ground surface.

Track assembly 12 may be a chain that includes multiple structurally similar link subassemblies, each of which may include a pair of links. A pair of links may include a link 22 and a respectively paired link (not shown in the enlarged section of FIG. 1, which is a side view) that is parallel and spaced opposite from link 22. Links 22 and their respectively paired links may be straight or offset links, and each include apertures at respective opposite ends (e.g., a first-end aperture and a second-end aperture).

Successive link subassemblies may be coupled by a pin 28 and a bushing 100. For example, to couple a first link subassembly with a successive a second link subassembly, pin 28 may be fixedly received in the first-end apertures of the links of the first link subassembly, and bushing 100 may be fixedly received in the second-end apertures of the links of the second link assembly. As such, pin 28 and bushing 100 couple two link subassemblies together to form a portion of track assembly 12.

Figure 2A:
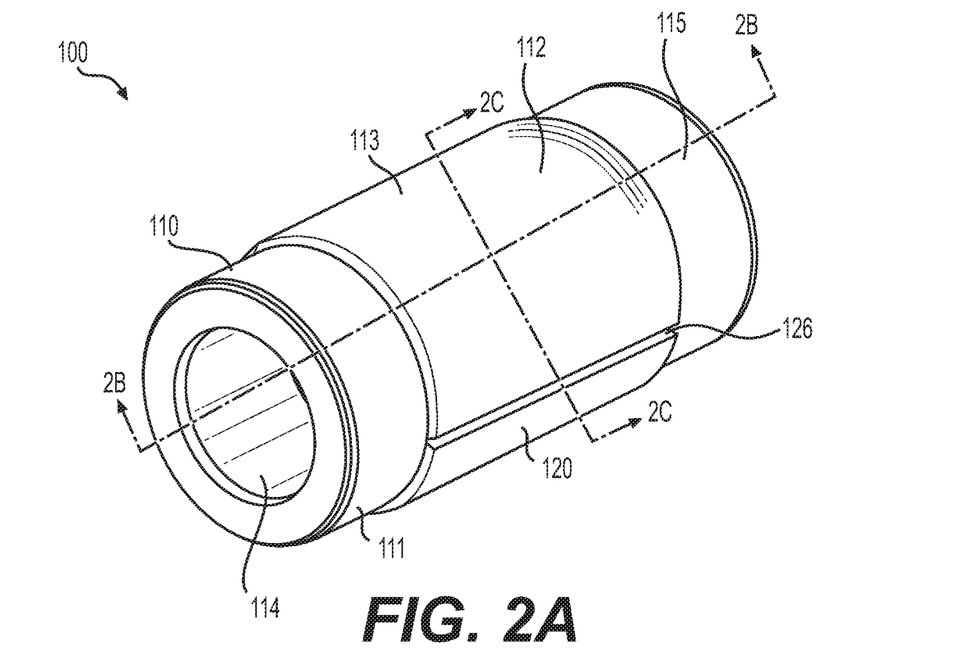
FIG. 2A is a perspective view of an exemplary bushing for a track assembly.
Figure 2B:
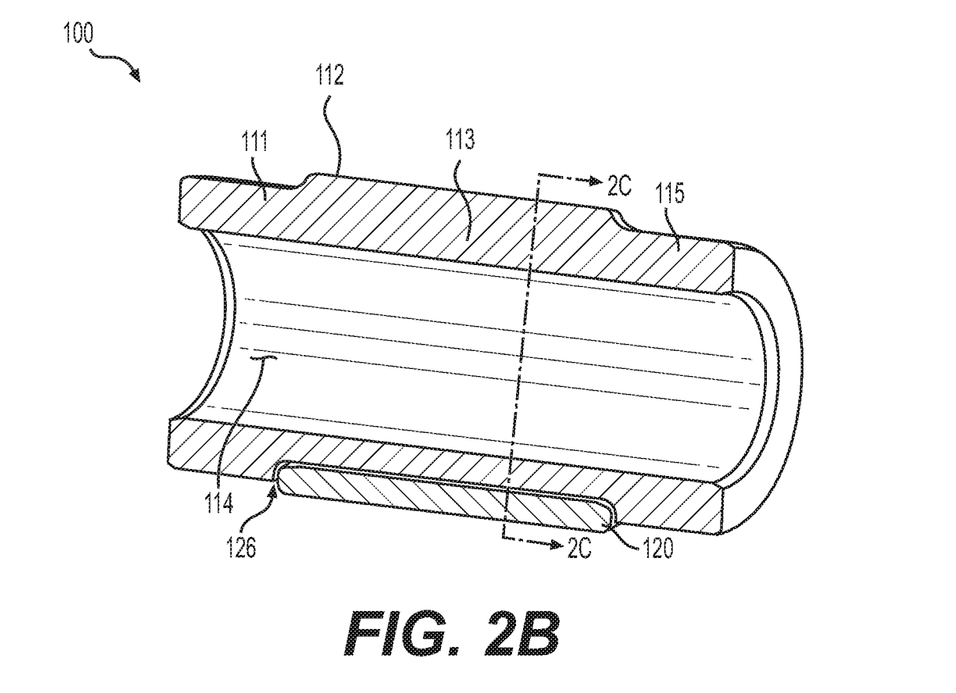
FIG. 2B is a longitudinal cross-sectional view of the bushing of FIG. 2A.
Figure 2C:
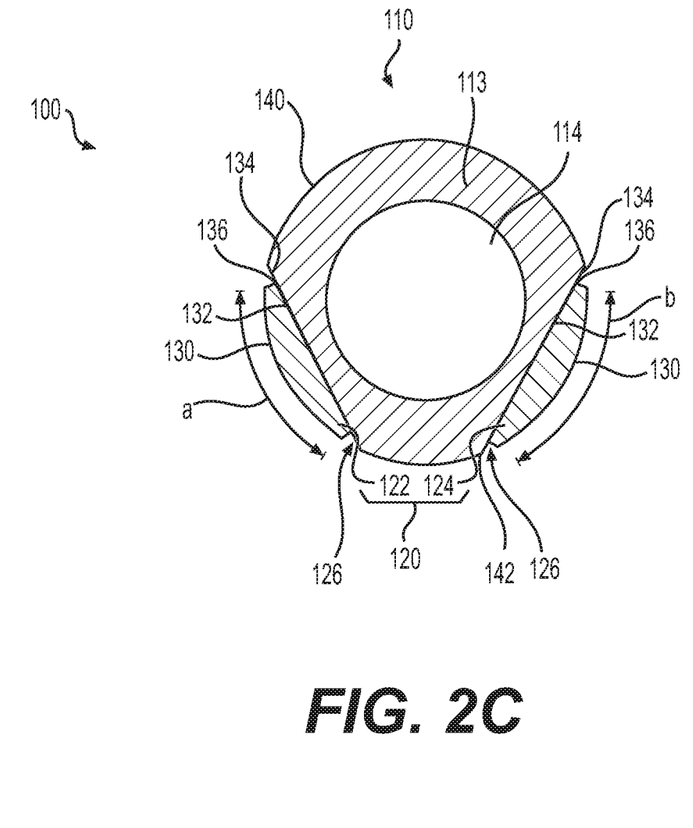
FIG. 2C is a transverse cross-sectional view of the bushing of FIG. 2A.

Each pin 28 may be a substantially cylindrical rod, and may be sized to be slip fit through bushing 100. Each bushing 100 may be generally cylindrical, with a cylindrical channel extending longitudinally through bushing 100 as a bore 114 (FIGS. 2A-2C). Bore 114 may have a constant diameter to rotatably receive pin 28.

Each bushing 100 may include one or more wear members or outer members 120 around and/or covering a portion of a central portion of bushing 100. The one or more outer members 120 may serve as a contact surface that engages sprocket 16 when track assembly 12 is driven by sprocket 16. Additional aspects of bushing 100 and the one or more outer members 120 are described below in connection with FIGS. 2A-2C and other figures.

FIG. 2A is a perspective view of bushing 100, according to aspects of the present disclosure. FIG. 2B is a longitudinal cross-sectional view of bushing 100, corresponding to the cross-section 2B-2B marked in FIG. 2A. FIG. 2C is a transverse cross-sectional view of the bushing 100, showing the section corresponding to the cross-section 2C-2C marked in FIGS. 2A and 2B. As shown in these figures, bushing 100 may include a tubular bushing substrate 110 having a longitudinal length and an outer surface 112. Bushing 100 may further include one or more outer members 120 fixed to outer surface 112 of tubular bushing substrate 110.

Outer member(s) 120 may be wear-resistant. When bushing 100 is used in track assembly 12, outer member(s) 120 may serve as a wear-resistant layer providing bushing 100 with enhanced wear resistance when bushing 100 engages sprocket 16. In general, outer member(s) 120 may be or include at least one member, wherein such a member may be an at least partially cylindrical member (e.g., rounded outer surface) or an arc segment. In some embodiments, outer member(s) 120 may include at least one arc segment (e.g., a single arc segment or a plurality of arc segments) fixed to outer surface 112. In some embodiments, as shown in FIG. 2C, outer member(s) 120 may include a curved outer surface 130 and a flat inner surface 132. Additionally, outer surface 112 may include one or more flat outer surfaces 134 (FIG. 2C). Accordingly, as shown in FIG. 2C, flat inner surface 132 of outer member(s) 120 may be coupled to flat outer surface 134 at an interface 136. As discussed in detail below, interface 136 may include one or more coupling mechanisms, for example, brazing materials.

Tubular bushing substrate 110 may have a first end portion 111, a central portion 113, and a second end portion 115. Additionally, tubular bushing substrate 110 includes bore 114 to receive a track pin, such as pin 28 discussed above with respect to FIG. 1. Bore 114 may have a constant diameter such that pin 28 may rotate within bore 114 as track assembly 12 is driven by sprocket 16.

A recess 126 may be formed in outer surface 112 of tubular bushing substrate 110. For example, as shown in FIGS. 2A-2C, recess 126 may be formed in the portion of outer surface 112 corresponding to central portion 113 of tubular bushing substrate 110. Recess 126 may be a circumferential recess traversing the entire circumference of central portion 113 or one or more portions of the circumference of central portion 113. For example, as shown in FIG. 2B, the portion of central portion 113 that forms recess 126 may be radially within first end portion 111 and second end portion 115. Outer member(s) 120 may be at least partially disposed in recess 126. In this aspect, recess 126 may include and/or form flat outer surface 134, which may be coupled to flat inner surface 132 to form interface 136. Accordingly, the thickness of tubular bushing substrate 110, for example, the thickness of central portion 113, may vary around the circumference. The thickness (e.g., between flat outer surface 134 and bore 114) of central portion 113 may be approximately 10 mm, or approximately 7 mm, or approximately 4 mm, at a thinnest portion, and may widen to approximately 12 to 25 mm, for example, approximately 15 to 18 mm.

Although two recesses 126 are shown in FIGS. 2A-2C, the present disclosure is not so limited. In other examples, the portion(s) of tubular bushing substrate 110 on which one or more outer member(s) 120 are disposed (e.g., flat outer surface 134 on central portion 113) may be flush with other portions of tubular bushing substrate 110 (e.g., end portions 111 and 115), or be stepped-up (e.g., radially protruded) relative to those other portions, instead of being recessed as shown in FIGS. 2A-2C.

Additionally, as shown in FIGS. 2B and 2C, the one or more recesses 126 may span only a portion of the circumference of central portion 113. For example, tubular bushing substrate 110 may include two recesses 126, and recesses 126 may form flat outer portions 134. Additionally, recesses 126 may be spaced closer to one side of tubular bushing substrate 110 (e.g., the side of bushing 100 that engages sprocket 16, or the bottom of tubular bushing substrate 110 in FIG. 2C). In this aspect, recesses 126 may span approximately 45 to 120 degrees, for example, approximately 60 to 90 degrees, of the outer circumference of tubular bushing substrate 110. In one aspect, and as shown in FIG. 2B, the one or more recesses 126 may span a longitudinal length of central portion 113. In another aspect, although not shown, the one or more recesses 126 may span only a portion of the longitudinal length of central portion 113. For example, the one or more recesses 126 may span one or more portions of central portion 113, such that one or more outer member(s) 120 may be positioned on tubular bushing substrate 110 to contact and engage with sprocket 16.

Bushing 100 may be a faceted bushing, and tubular bushing substrate 110 may include a plurality of sides, faces, and/or rounded portions. For example, recesses 126 may be separated by non-recessed portions of tubular bushing substrate 110. In this aspect, as shown in FIG. 2C, a first portion 140 and a second portion 142 may separate recesses 126 on respective sides of tubular bushing substrate 110. First portion 140 may span a larger portion of the outer circumference than second portion 142, and more than recesses 126. In one aspect, second portion 142 may span approximately the same outer circumference as recesses 126. For example, second portion 142 may span approximately 30 to 60 degrees, for example, 45 degrees, of the outer circumference of tubular bushing substrate 110. First portion 140 may span approximately 120 to 240 degrees, for example, approximately 180 degrees, of the outer circumference of tubular bushing substrate 110. First portion 140 and second portion 142 may each be rounded or substantially rounded. Although transitions from recess 126 to first portion 140 and second portion 142 are shown in FIG. 2C as substantially abrupt to form points, this disclosure is not so limited as the transitions may be gradual, rounded, etc.

Outer member(s) 120 may include a first arc segment 122 and a second arc segment 124 fixed to outer surface 112 of tubular bushing substrate 110. Arc segments 122, 124 may be successively arrayed along a circumferential direction around tubular bushing substrate 110, for example, within recesses 126, as shown in FIG. 2C. Although not shown, it is also contemplated that multiple arc segments may be arrayed along the longitudinal length of tubular bushing substrate 110.

Arc segments 122, 124 have curved outer surfaces 130 and flat inner surfaces 132. Accordingly, the thickness of arc segments 122, 124 changes based on the location along the arc of arc segments 122, 124 (e.g., gradually increasing or decreasing along a circumferential direction around tubular bushing substrate 110), but the thickness of arc segments 122, 124 may be constant along a longitudinal length of tubular bushing substrate 110. In one example, the edges of arc segments 122, 124 may be approximately 1 to 3 mm, and the central portions of arc members 122, 124 may be approximately 5 to 15 mm, for example, approximately 8 mm. Additionally, in some aspects, edges of arc segments may be thinner than 1 mm, and may substantially eliminate gaps and/or transitions between recesses 126 and first portion 140 and second portion 142 (e.g., forming a smooth transition for a circular bushing 100).

Arc segments 122, 124 may each have a thickness such that a portion of each of arc segments 122, 124 protrudes out of recess 126 in a radial direction. For example, arc segments 122, 124 may extend radially beyond central portion 113. However, it is also possible for arc segments 122, 124 to be flush with outer surface of central portion 113, for example, extend radially to be flush with first portion 140 and second portion 142. The depth of recess 126 may depend on the thickness of outer member(s) 120, which in turn may depend on the material that forms outer member(s) 120. The overall outer diameter of bushing 100 (including outer member(s) 120) may depend on the application of bushing 100 (e.g., type and/or size of track assembly 12, machine 10, etc.).

As shown in FIGS. 2A-2C, outer member(s) 120 may extend over less than a full circumference of tubular bushing substrate 110. For example, if bushing 100 is used in track assembly 12, then outer member(s) 120 may cover one or more portions of bushing 100 that engages sprocket 16. In such an arrangement, outer member(s) 120 does not necessarily need to cover the portions of bushing 100 that do not contact sprocket 16. For example, a portion of central portion 113 of tubular bushing substrate 110 that is exposed (not covered) by outer member(s) 120 may be facing away from sprocket 16 (when sprocket 16 is engaged) and facing toward track shoe 18 attached to the link subassembly to which tubular bushing 100 is fixed.

Furthermore, outer member(s) 120 may extend less than an entirety of the longitudinal length of tubular bushing substrate 110. For example, as shown in FIGS. 2A and 2B, outer member(s) 120 may cover a portion of recess 126 formed in central portion 113, without covering end portions 111 and 115. However, it is also possible for outer member(s) 120 to extend over the entire longitudinal length of tubular bushing substrate 110.

As shown in FIG. 2C, arc segments 122, 124 include curved outer surfaces 130 and flat inner surfaces 132. As mentioned, each flat inner surface 132 maybe coupled to flat outer surface 134 (e.g., of recesses 126) to form interfaces 136. Arc segments 122, 124 may span a majority of recesses 126 (as shown in FIG. 2C), for example, approximately 90% of recesses 126, or arc segments 122, 124 may span an entirety of recesses 126. Moreover, arc segments 122, 124 may span angles a and b, respectively. Angles a and b may each span angles of approximately 45 to 60 degrees of the outer circumference of tubular bushing substrate 110. Angles a and b may be approximately the same, or one of angles a and b may be larger than the other angle. Outer member 120 may thus span a total of approximately 90 to 240 degrees of the outer circumference of tubular bushing substrate 110.

It is noted that outer member 120 may include one, three, four, or more arc segments, and outer member 120 may span any portion of the outer circumference of tubular bushing substrate 110, for example, any angle that is greater than 0 degrees and less than or equal to 360 degrees. Moreover, individual arc segments (e.g., 122, 124) may span any portion of the outer circumference of tubular bushing substrate 110, for example, any angle that is greater than 0 degrees, and less than or equal to 180 degrees, and the angle may be continuous or discontinuous, as shown in FIG. 2C. In some embodiments, outer member 120 may span an angle in a range of approximately 90 degrees to 360 degrees, and individual outer members (e.g., 122, 124) may span an angle in a range of from approximately 30 degrees to approximately 180 degrees.

Figure 3:
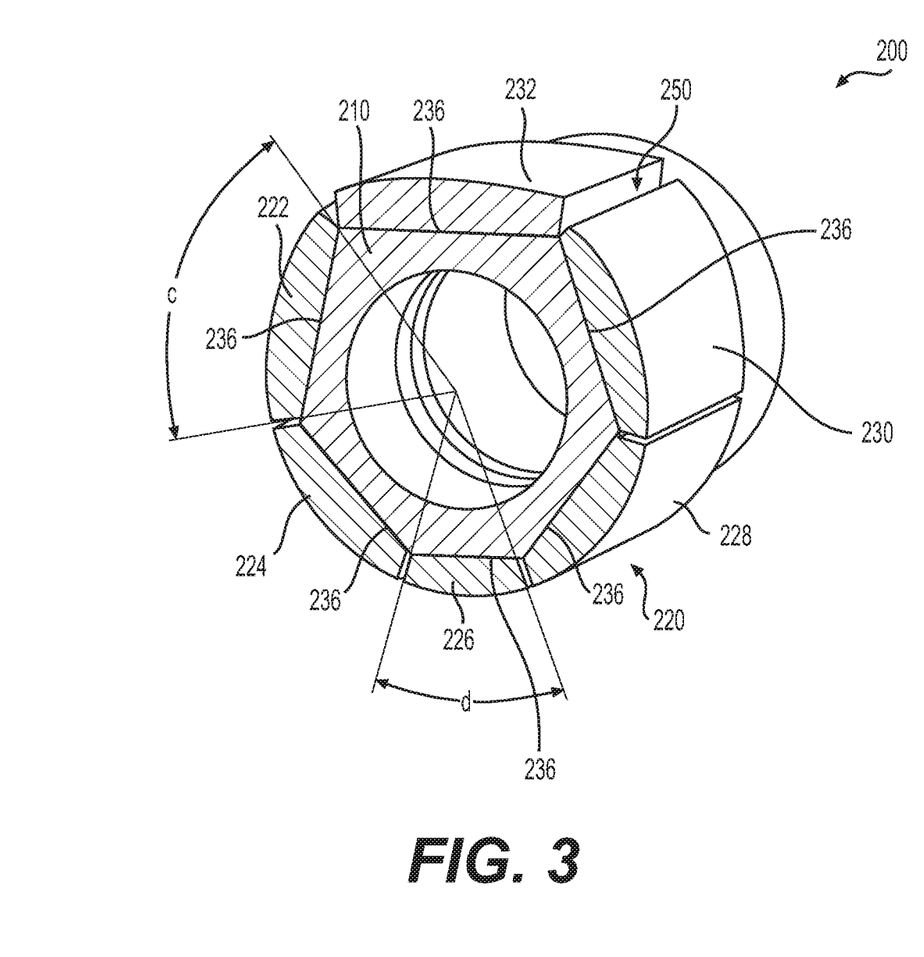
FIG. 3 illustrates a cross-sectional view of another exemplary bushing for a track assembly.

FIG. 3 illustrates a cross-sectional view of another exemplary bushing 200, with similar elements to bushing 100 shown by 100 added to the reference numbers. Bushing 200 includes a tubular bushing substrate 210. Tubular bushing substrate 210 includes a plurality of flat outer surfaces that form interfaces 236 with portions of an outer member 220, for example, arc segments 222, 224, 226, 228, 230, 232. For example, tubular bushing substrate 210 may includes a substantially hexagonal outer surface, and six arc segments 222, 224, 226, 228, 230, 232 may be coupled to respective surfaces of tubular bushing substrate 210 at interfaces 236. It is noted, however, that tubular bushing surface 210 may include other cross-sectional shapes. For example, the outer surface of tubular bushing substrate 210 may be triangular, square or rectangular, pentagonal, heptagonal, octagonal, etc. Moreover, the outer surfaces of tubular bushing substrate 210 (e.g., the surfaces that form interfaces 236) may each be the same size, or one or more surfaces may be larger than one or more other surfaces. Additionally, similar to the outer surface of tubular bushing substrate 110, the outer surfaces of tubular bushing substrate 210 may include any number of flat surfaces, and any number of curved or rounded surfaces, either between the flat surfaces or otherwise spanning the outer circumference of tubular bushing substrate 210.

Arc segments 222, 224, 226, 228, 230, 232 may span substantially the entire outer circumference of tubular bushing substrate 210. Arc segments 222, 224, 226, 228, 230, 232 may span respective angles, which may be the same or may be different angles. For example, arc segments 222, 224, 226, 228, 230, 232 may each span approximately 45 to 60 degrees of the outer circumference of tubular bushing substrate 210. As shown in FIG. 3, arc segment 222 may span an angle c, and arc segment 226 may span an angle d. Angles c and d may be approximately the same, or as shown in FIG. 3, one of angles c and d may be larger than the other angle.

Similarly, the sizes of arc segments 222, 224, 226, 228, 230, 232 may be the same, or may vary in a similar manner as the spanned angles. Moreover, successive arc segments 222, 224, 226, 228, 230, 232 may abut adjacent outer members to be in direct physical contact with one another. Alternatively, as illustrated in FIG. 3, successive arc segments, for example, arc segments 230 and 232, may be spaced apart from one another in a circumferential direction to form a gap 250.

In general, outer members 120, 220 and tubular bushing substrates 110, 210 may be formed of different respective materials. Constituent member(s) of outer members 120, 220, such as arc segments 122, 124, 222, 224, 226, 228, 230, 232 described above, may be formed of a wear-resistant material, such as white iron. In this disclosure, the term "white iron" means cast iron in which all or substantially all carbon is present as carbide. When formed of white iron, member(s) of outer members 120, 220 may be referred to as white iron member(s). Examples of white iron include pearlitic (FeC) white irons, Ni-hard or Ni—Cr ($M_3C$) white irons, Ni-hard 4 ($M_7C_3$) white irons, and high-Cr ($M_7C_3$) white irons (also referred to as "high chrome white irons"). In some embodiments, outer members 120, 220 may include white iron member(s) formed of a high chrome white iron having a chromium content of 12 wt. % or higher (e.g., a chromium content of 12 wt. %, 15 wt. %, 20 wt. %, or 25 wt. %) and suitable contents of other elements (e.g., a carbon content in a range of 2 to 3 wt. %, a molybdenum content of 0.5 to 3.5 wt. %, a manganese content of 0.5 to 1.5 wt. %, a silicon content of up to 1.0 wt. %, and a nickel content of up to 0.5 wt. %), with a balance being iron. Examples of white irons include white irons specified by ASTM A532 (e.g., ASTM A532 II-A, II-B, II-C, II-D, II-E, and III-A high chrome cast irons, and ASTM A532 Ni-hard cast irons). White irons may also be referred to as abrasion-resistant cast irons. While examples of white irons have been given, the present disclosure is not so limited, and it is understood that a white iron member may be formed of any suitable hard wear facing white iron.

Tubular bushing substrates 110, 210 may be formed of steel of any suitable type. Tubular bushing substrates 110, 210 may be formed by any formation process. In one aspect, tubular bushing substrates 110, 210 may be formed in an extrusion process, for example, to produce a plurality of tubular bushing substrates 110, 210 that may then be cut or otherwise separated to form individual tubular bushing substrates 110, 210. In some embodiments, tubular bushing substrate 110, 210 may be formed of high-carbon chromium steel. High-carbon chromium steel encompasses chromium-containing steel having a carbon content of 0.55 wt. % or higher, such as 52100 alloy steel. The steel forming tubular bushing substrates 110, 210 may be heat-treated (e.g., using induction or furnace heating) or non-heat-treated steel. Examples of heat treatment processes include carburization and case hardening. For example, carburizing one or more portions of the tubular bushing substrates 110, 210 may yield a high-carbon steel. In some embodiments, in addition to or as an alternative to using high-carbon chromium steel for tubular bushing substrates 110, 210, the outer surface of tubular bushing substrates 110, 210 may be carburized at locations where outer members 120, 220 are disposed. For example, the part of the outer surface within recesses 126, 226 (e.g., the portion of that forms flat outer surfaces 134) may be carburized. It is noted that the aforementioned carburization steps may be performed before and/or after brazing or otherwise coupling outer members 120, 220 to tubular bushing substrates 110, 210. Alternatively, one or more portions of tubular bushing substrates 110, 210 may be hardened by induction hardening.

In general, portions of outer members 120, 220 may have any suitable shape, size, and/or surface texture. For example, an arc segment may be a small arc, a large arc, button-shaped, rounded, smooth, or rough. The coverage area of one arc segment on the circumference of tubular bushing substrate 110 may be non-rectangular (e.g., may be round, diamond-shaped, etc.). The arc segments constituting outer members 120, 220 may have any suitable combination of differing shapes, differing sizes, and/or surface textures, to form a patchwork on tubular bushing substrate 110.

The arc segments of outer members 120, 220 may be fixed to the outer surfaces of tubular bushing substrates 110, 210 by any suitable fixation method, for example, soldering, welding, bonding, or one or more other coupling mechanisms. In some embodiments, and as discussed herein, the segments of outer members 120, 220 are brazed to the outer surfaces of tubular bushing substrates 110, 210, for example, by melting and/or flowing (e.g., by capillary action) a filler metal (e.g., one or more of aluminum-silicon, copper (e.g., copper powder), copper-silver, copper-zinc (brass), copper-tin (bronze), gold-silver, a nickel alloy (e.g., Nicrobraz 152 by Wall Colmonoy), silver, an amorphous brazing foil using nickel, iron, copper, silicon, boron, phosphorous, and/or other materials) between outer members 120, 220 and tubular bushing substrates 110, 210. In this aspect, the segments of outer members 120, 220 are fixed to tubular bushing substrates 110, 210 via a solidified brazing filler. The solidified brazing filler may be referred to as a brazed joint.

Figure 4A:
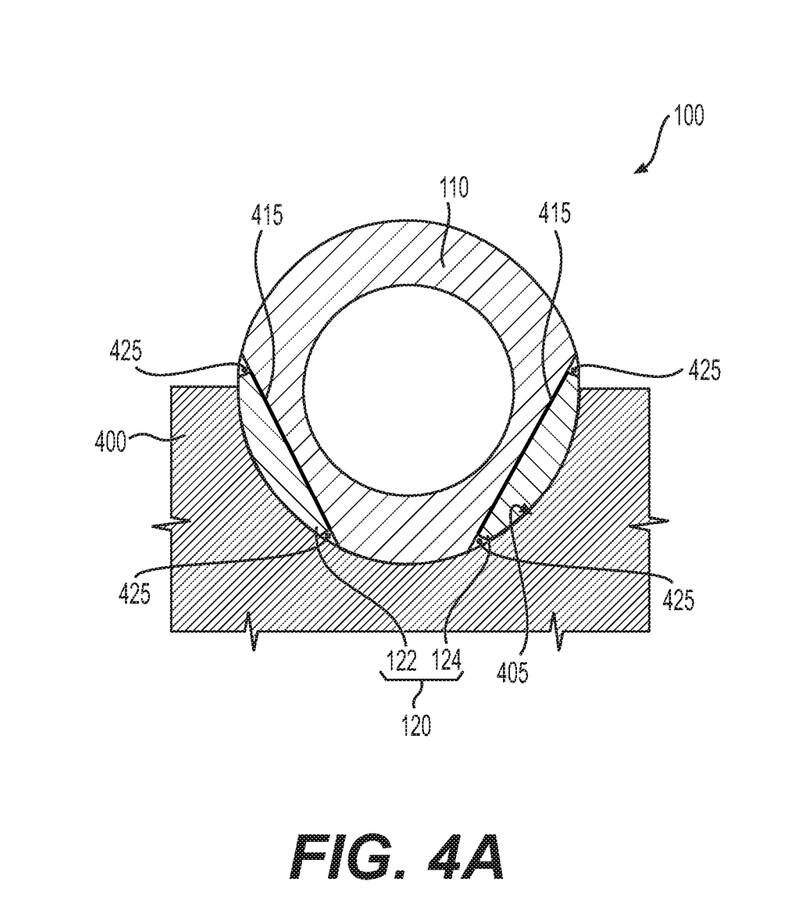
FIG. 4A illustrates the use of a holding fixture to produce the bushing of FIG. 2A using a brazing method.
Figure 4B:
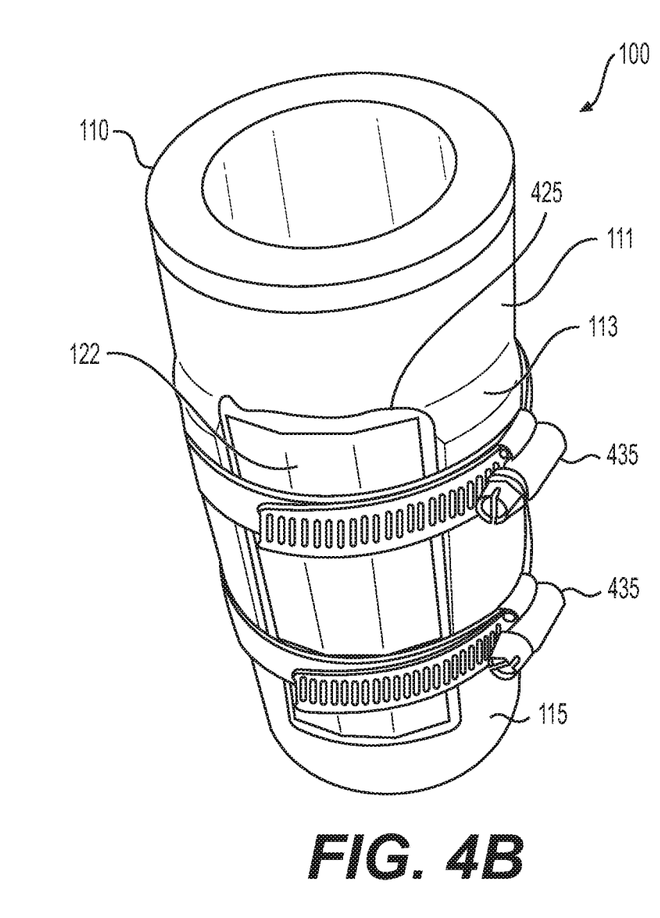
FIG. 4B illustrates the use of another holding fixture to produce the bushing of FIG. 2A using a brazing method.

FIGS. 4A and 4B illustrate holding fixtures that may be used to help produce bushing 100, for example, by brazing a plurality of segments (e.g., arc segments 122, 124) to central portion 113 (FIGS. 2A and 2B) of tubular bushing substrate 110. Although arc segments 122, 124 are discussed below, the aspects of FIGS. 4A and 4B may be implemented to braze and join arc segments 222-232 to tubular bushing substrate 210 and form bushing 200.

As shown in FIG. 4A, the brazing method may be performed using a holder 400. Holder 400 may have a holding surface 405 designed to hold outer member 120 (e.g., arc segments 122, 124) in place while brazing to tubular bushing substrate 110. Furthermore, a brazing filler 415 may be positioned between arc segments 122 and tubular bushing substrate 110. Brazing filler 415 may be in the form a sheet or foil (e.g., pure copper, a copper-based alloy, pure nickel, a nickel-based alloy, or a blend of copper-based and nickel-based alloys) that may be positioned between the interface of arc segments 122, 124 and tubular bushing substrate 110. Additionally or alternatively, a brazing paste 425 may be positioned and/or applied between and/or around the interface of arc segments 122, 124 and tubular bushing substrate 110. For example, brazing paste 425 may be applied as a bead around a perimeter of arc segments 122, 124. Brazing paste 425 may include a powder (e.g., pure copper, a copper-based alloy, pure nickel, a nickel-based alloy, or a blend of copper-based and nickel-based alloys) and a binder material (e.g., a water-based gel suspension agent). The binder material may burn off when heated (e.g., via a brazing procedure in a furnace). The brazing procedure may be performed with brazing filler 415, with brazing paste 425, or with both brazing filler 415 and brazing paste 425.

As shown in FIG. 4A, holding surface 405 of holder 400 may have a concave contour that substantially matches the outer contour of arc segments 122, 124 when arc segments 122, 124 are mated to tubular bushing substrate 110. Holder 400 may be sized and/or shaped to receive a portion of bushing 100 and span approximately 180 degrees of bushing 100. In some embodiments, holder 400 may be a cradle or a tube, and holding surface 405 may be a concave surface of the cradle, or the inner surface of the tube. It is noted, however, that the present disclosure is not so limited, and that holder 400 may, in general, be any apparatus suitable for holding the aforementioned components in place during brazing. For example, holder 400 may be a wire or plurality of wires. Additionally, holder 400 may a plurality of pieces that collectively provide holding surface 405.

FIG. 4B illustrates an additional or alternative holding fixture that may be use to help produce bushing 100, for example, by brazing a one or more outer members (e.g., arc segment 122) to central portion 113 of tubular bushing substrate 110. As shown, the brazing procedure may include one or more hose clamps 435. Hose clamp(s) 435 may be positioned around central portion 113 and arc segment 122 and tightened to help secure arc segment 122 to central portion 113. As such, a holding surface (not shown) of hose clamp(s) 435 may contact the outer surfaces of central portion 113 and arc segment 122. Arc segment 122 may then be brazed or otherwise coupled to tubular bushing substrate 110, for example, via a brazing filler (not shown), brazing paste 425, etc. Although only one arc segment 122 is shown, it is noted that hose clamp(s) 435 may be positioned around and help secure multiple arc segments 122 to tubular bushing substrate 110. Moreover, even though two hose clamps 435 are shown, one, three, or more hose clamps 435 may be used to help secure one or more arc segments 122, 124 to central portion 113 of tubular bushing substrate 110. Additionally, although not shown, one or more hose clamp(s) 435 may be used to help couple arc segment 122 to tubular bushing substrate 110 to form bushing 100, as shown in FIG. 4B, and bushing 100 with hose clamp(s) 435 may also be positioned in holding fixture 400, as shown in FIG. 4A.

Figure 5:
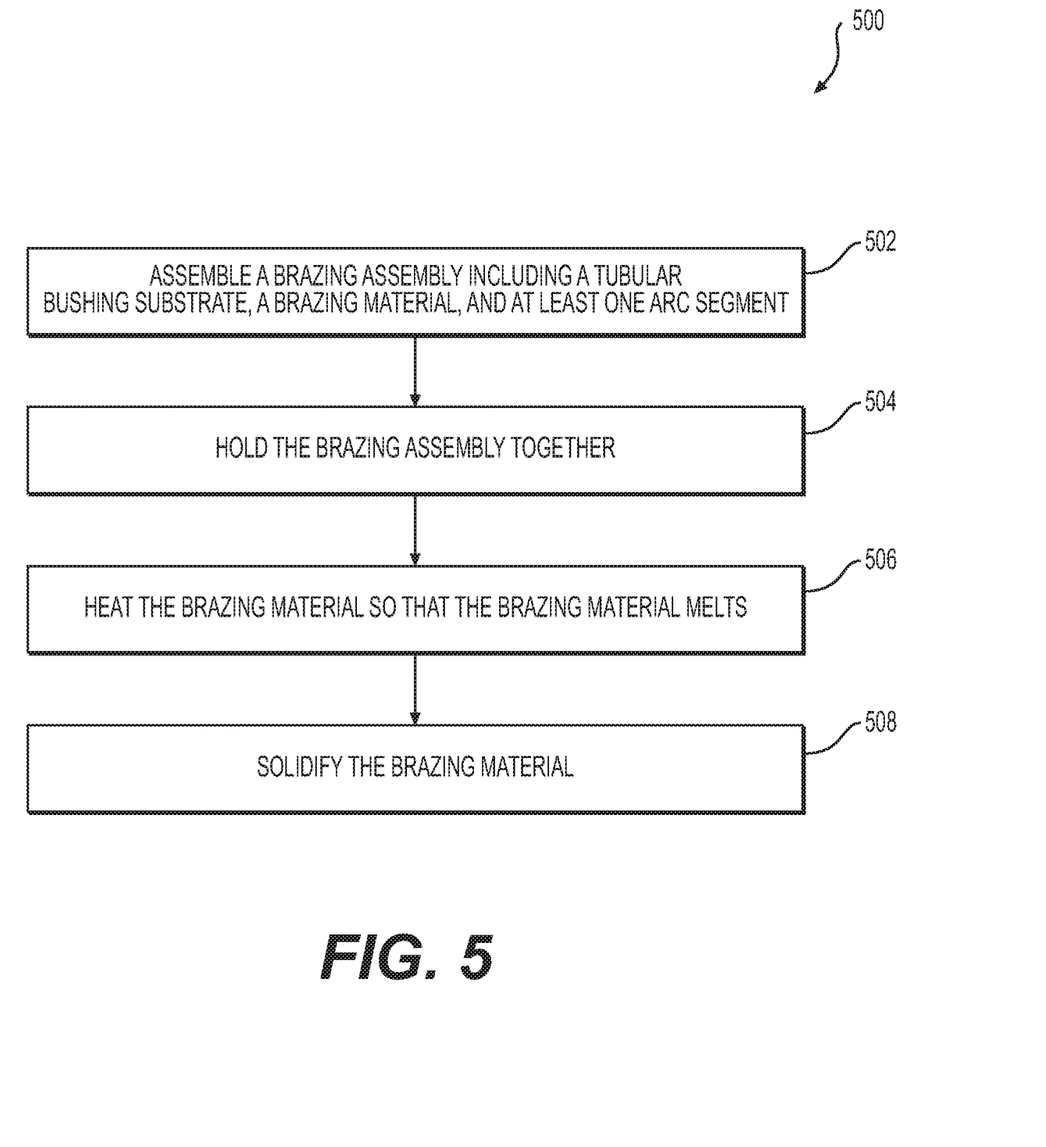
FIG. 5 is a flowchart illustrating a method of brazing an arc segment to a tubular bushing substrate using one or more of the holding fixtures illustrated in FIGS. 4A and 4B.

FIG. 5 is a flowchart illustrating a method of brazing an arc segment to a tubular bushing substrate using holding fixture 400 and/or hose clamp(s) 435, as illustrated in FIG. 4A and/or FIG. 4B. A step 502 may include assembling a brazing assembly including a tubular substrate (e.g., tubular bushing substrate 110), a brazing material (e.g., brazing filler 415 and/or brazing paste 425), and at least one arc segment (e.g., arc segments 122, 124). In the brazing assembly, arc segments 122, 124 may be mated to tubular bushing substrate 110, with brazing filler 415 interposed between tubular bushing substrate 110 and arc segments 122, 124. Brazing filler 415 may initially be in the form of a foil that is positioned around at least the portion of outer surface 112 of tubular bushing substrate 110 that is to be covered by arc segments 122, 124. Additionally or alternatively, brazing paste 425 may be applied around the edges of arc segments 122, 124.

A step 504 may include holding the brazing assembly together, for example, using holder 400 and/or hose clamp(s) 435. In step 504, for example, holding surface 405 of the holder 400 may be placed on arc segments 122, 124, as shown in FIG. 4A, to help hold arc segments 122, 124 in place. Alternatively or additionally, as shown in FIG. 4B, one or more hose clamps 435 may be positioned and tightened around arc segments 122, 124 and tubular bushing substrate 110 to help hold arc segments 122, 124 in place.

Next, a step 506 may include heating the brazing material (e.g., brazing filler 415 and/or brazing paste 425) so that the brazing material melts. In this aspect, brazing filler 415 may melt and/or flow between tubular bushing substrate 110 and arc segments 122, 124. Moreover, heating may cause brazing paste 425 to melt and/or flow between tubular bushing substrate 110 and arc segments 122, 124. Heating may also help to remove (i.e., burn off) the filler material in brazing paste 425. The brazing may be performed in a furnace, for example, a vacuum furnace. The heating may be performed while holding the brazing assembly together using holder 400 and/or hose clamp(s) 435. For example, bushing 100 may be positioned horizontally, as shown in FIG. 4A, and heated in the furnace to melt the brazing material. Alternatively, as shown in FIG. 4B, bushing 100 may be positioned vertically and heated in the furnace to melt the brazing material.

A step 508 may then include solidifying the brazing material, for example, brazing filler 415 and/or brazing paste 425. In step 508, the brazing material may be cooled and solidified so that arc segments 122, 124 are joined to tubular bushing substrate 110 via the solidified brazing material. In one aspect, bushing 100 may be removed from the furnace and quenched. The entire brazing assembly may be heated in step 506 and cooled in step 508. Although not shown, in an instance where arc segments 122, 124 abut one another or are closely positioned circumferentially around tubular bushing substrate 110, the solidified brazing filler 415 and/or solidified brazing paste 425 may also join the adjacent arc segments to one another, for example, by partially or fully flow into and filling a gap between adjacent arc segments (i.e., gap 250 in FIG. 3).

Although embodiments using brazing have been described, it is also possible to attach outer member 120 (and any of its constituent members, such as arc segments 122, 124) to tubular bushing substrate 110 using other suitable forms of attachments. For example, other forms of attachments may include soldering (e.g., high strength soldering), mechanical press fitting, welding (e.g., plasma-transferred arc (PTA) welding), and/or attachment via epoxy and/or other adhesives. That is, the plurality of arc segments constituting outer member 120 may be soldered, mechanically press fitted (e.g., with one or more recess 126 forming openings to receive outer member 120), welded, or adhered to tubular bushing substrate 110. It is noted that the various forms of attachments are not intended to be mutually exclusive, and may be used in combination with one another. Furthermore, one or more arc segments 122, 124 may include more than one flat inner surface, for example, an inner surface with two flat surfaces forming a V-shaped inner surface. One or more arc segments 122, 124 may also include three or more flat inner surfaces. Moreover, tubular bushing substrate 110 may include one or more outer surfaces that correspond to the inner surface(s) of the one or more arc segments 122, 124. For example, if arc segment 122 includes a V-shaped inner surface, tubular bushing substrate may include a V-shaped outer surface. Tubular bushing substrate 110 and the one or more arc segments 122, 124 may be coupled, as discussed above.

INDUSTRIAL APPLICABILITY

The disclosed aspects of track assembly 12 may be used in any machine that includes a tracked undercarriage that includes links coupled together to form one or more tracks. Track assembly 12 described herein may provide greater wear-resistance, a longer work duration, an increased performance, a reduced risk of deformation, and a lower likelihood of requiring maintenance or replacement. Additionally, the size and thickness of bushing 100, the number and position of arc segments, and other aspects discussed here may be modified to suit different track assemblies 12 and/or machines 10.

The disclosed aspects of bushings 100, 200, including outer members 120, 220, may provide wear-resistance for the portion of bushings 100, 200 that contacts sprocket 16, when bushings 100, 200 are used in track assembly 12. Accordingly, track bushing wear life may be increased, leading to lower fleet undercarriage maintenance costs.

As described above, outer members 120, 220 may be made of white iron, which provides for wear resistance. The white iron material of outer members 120, 220 may be different from the material of the underlying tubular bushing substrates 110, 210. Therefore, outer members 120, 220 may serve a specialized wear-resistant layer that confers wear resistance to bushings 100, 200 while avoiding potential expenses of having the entire bushing be constructed of the same wear-resistant material. Moreover, bushings 100, 200 may be formed of thinner material, with outer members 120, 220 helping to increase the wear resistance. Tubular bushing substrates 110, 210 may additionally have wear-resistant properties, such as a high-carbon chromium steel composition or a carburized layer as described above. Therefore, if outer members 120, 220 become worn out, bushings 100, 200 may still function with a degree of wear resistance.

Moreover, outer members 120, 220 (e.g., each of arc segments 122, 124, etc.) are coupled to tubular bushing substrates 110, 210 via interfaces 136, 236, with each surfaces at interfaces 136, 236 including flat faces. In this aspect, for example, brazing flat inner surface 132 with flat outer surface 134 may help to allow the brazing material (e.g., brazing filler 415 and/or brazing paste 425) to flow between tubular bushing substrate 110 and outer member 120. Interfaces 136, 236 being flat may also help to increase the contact area and/or the strength of the coupling between outer member 120 and tubular bushing substrate 110. Moreover, interfaces 136, 236 being flat may help to minimize risks of poor bonding, separation, etc., as there may be a reduced risk of differences in thermal expansion (e.g., between outer member 120 and tubular bushing substrate 110) and/or other material properties affecting the contact areas, interfaces 136, 236 and/or brazing materials.

As described above, outer members 120, 220 may be assembled from a plurality of smaller members, such as arc segments 122, 124, etc. Therefore, production of bushings 100, 200 may be potentially facilitated in cases in which it is more cost effective to produce a plurality of white iron arc segments than a continuous, one-piece white iron sleeve or wear element. Furthermore, in certain embodiments, the arc segments constituting outer members 120, 220 may cover less than the entire circumference of tubular bushing substrates 110, 210, thereby potentially permitting the cost of outer members 120, 220 to be reduced as compared to a sleeve or wear element that covers the entire circumference.

As described above, outer members 120, 220 may be disposed in one or more recesses 126 formed in outer surface 112 of tubular bushing substrate 110. Recesses 126 may provide for design flexibility with respect to the overall outer diameter of bushing 100 with outer members 120 included. For example, if the thickness of arc segments forming outer member 120 is constrained to a limited range of thicknesses, the overall outer diameter of bushing 100 may be still be set based on the depth of recesses 126. Moreover, tubular bushing substrates 110, 210 may be formed of an extruded steel and cut into individual tubular bushing substrates 110, 210, which may reduce and/or streamline production time.

As described above, holder 400 and/or hose clamp(s) 435 may be used to braze arc segments (e.g., 122, 124, etc.) of outer members 120, 220 to tubular bushing substrates 110, 210. Accordingly, holder 400 and/or hose clamp(s) 435 may facilitate production of bushings 100, 200 having a multi-segment outer members 120, 220 fixed to tubular bushing substrates 110, 210.

It will be apparent to those skilled in the art that various modifications and variations can be made to the disclosed system without departing from the scope of the disclosure. Other embodiments of the system will be apparent to those skilled in the art from consideration of the specification and practice of the bushing for a track assembly disclosed herein. It is intended that the specification and examples be considered as exemplary only, with a true scope of the disclosure being indicated by the following claims and their equivalents.

What is claimed is:

1. A bushing for a track assembly, comprising:
   a tubular bushing substrate having a longitudinal length and an outer surface, wherein the outer surface includes at least two flat portions spaced apart from each other; and
   at least two white iron members, wherein the at least two white iron members each include a flat inner surface, and wherein the flat inner surface of each of the at least two white iron members is fixed to a respective flat portion of the outer surface of the tubular bushing substrate, and wherein the at least two white iron members are spaced apart circumferentially around the tubular bushing substrate.

2. The bushing of claim 1, wherein each of the at least two white iron members includes a curved outer surface, wherein each of the at least two white iron members extends over a central portion of the tubular bushing substrate, and wherein each of the at least two white iron members extends less than an entirety of the longitudinal length of the tubular bushing substrate.

3. The bushing of claim 1, wherein the two white iron members each span a circumferential angle of approximately 45 to 120 degrees of the tubular bushing substrate.

4. The bushing of claim 1, wherein the at least two white iron members are brazed to the tubular bushing substrate.

5. The bushing of claim 1, wherein the tubular bushing substrate is formed of steel, and wherein at least a portion of the tubular bushing substrate is carburized.

6. The bushing of claim 1, wherein the tubular bushing substrate includes a central portion with a hexagonal cross-section, wherein the at least two white iron members includes six white iron members, and wherein each white iron member is brazed to one side of the central portion.

7. The bushing of claim 6, wherein the six white iron members form gaps between circumferentially adjacent white iron members.

8. The bushing of claim 7, wherein at least one of the six white iron members is a different size than another of the six white iron members.

9. The bushing of claim 1, wherein the tubular bushing substrate further includes a cylindrical bore extending longitudinally through the tubular bushing substrate configured to rotatably receive a pin.

10. A method of producing a bushing for a track assembly, comprising:
    fixing at least one white iron member to an outer surface of a tubular bushing substrate, wherein the at least one white iron member includes a flat inner portion, wherein the tubular bushing substrate includes a flat outer portion, and wherein the flat inner portion is mated to the flat outer portion, wherein the fixing is performed using a holding fixture having a holding surface, and wherein the fixing includes placing the holding surface of the holding fixture on the at least one white iron member, so that the at least one white iron member is held in place while being fixed to the tubular bushing substrate.

11. The method of claim 10, wherein the fixing the at least one white iron member includes brazing the at least one white iron member to the tubular bushing substrate.

12. The method of claim 10, further comprising carburizing at least a portion of the tubular bushing substrate either before or after mating the at least one white iron member to the tubular bushing substrate.

13. The method of claim 10, wherein the at least one white iron member extends over a central portion of the tubular bushing substrate, and extends less than an entirety of a longitudinal length of the tubular bushing substrate.

14. The method of claim 10, wherein the fixing the at least one white iron member to the outer surface of the tubular bushing substrate includes fixing at least two white iron members to spaced apart portions of the outer surface of the tubular bushing substrate.

15. A track assembly bushing, comprising:
a tubular bushing substrate having a longitudinal length, an axial bore configured to receive a pin, and a central portion with a plurality of flat surfaces; and a plurality of wear members, wherein each of the plurality of wear members includes a flat inner surface, and wherein each of the plurality of wear members is fixed to one of the plurality of flat surfaces, wherein the plurality of wear members form gaps between circumferentially adjacent wear members.

16. The track assembly of claim 15, wherein the plurality of wear members includes a plurality of white iron arc members brazed to the tubular bushing substrate.

17. The track assembly of claim 16, wherein the plurality of white iron members includes a plurality of white iron arc members successively arrayed circumferentially around the central portion of the tubular bushing substrate.

18. The track assembly of claim 17, wherein each one white iron member of the plurality of white iron arc members includes a curved outer surface and spans a circumferential angle of approximately 45 to 120 degrees, and wherein a portion of a circumference of the tubular bushing substrate is exposed from the plurality of white iron arc members, and wherein the portion of the circumference exposed by the plurality of white iron members faces a track shoe of the track assembly.

19. The track assembly of claim 15, wherein the tubular bushing substrate includes a central portion with a hexagonal cross-section, wherein the plurality of wear members includes six white iron members, and wherein each wear member is brazed to one side of the central portion.

* * * * *